(12) United States Patent
Baiocchi et al.

(10) Patent No.: US 7,506,976 B2
(45) Date of Patent: Mar. 24, 2009

(54) POLARIZED OPTICAL ELEMENT HAVING DIFFERENTIATED TRANSMITTANCE PROPERTIES FOR USE IN EYE-PROTECTING DEVICES

(75) Inventors: Paolo Baiocchi, Parma (IT); Graziano Marusi, Parma (IT); Federico Menta, Parma (IT)

(73) Assignee: Intercast Europe S.P.L., Parma (IT)

( * ) Notice: Subject to any disclaimer, the term of this patent is extended or adjusted under 35 U.S.C. 154(b) by 299 days.

(21) Appl. No.: 11/450,797

(22) Filed: Jun. 8, 2006

(65) Prior Publication Data

US 2007/0008485 A1 Jan. 11, 2007

Related U.S. Application Data

(60) Provisional application No. 60/689,742, filed on Jun. 10, 2005.

(51) Int. Cl.
*G02C 7/10* (2006.01)
(52) U.S. Cl. .............. 351/49; 351/45; 351/46
(58) Field of Classification Search ............ 351/41, 351/44, 49, 163, 165, 166, 45, 46
See application file for complete search history.

(56) References Cited

U.S. PATENT DOCUMENTS

| 6,250,759 | B1 * | 6/2001 | Kerns et al. | 351/165 |
| 7,002,744 | B2 | 2/2006 | Evans et al. | |
| 2006/0187411 | A1 * | 8/2006 | Boulineau et al. | 351/163 |

* cited by examiner

*Primary Examiner*—Hung X Dang
*Assistant Examiner*—Vipin M Patel
(74) *Attorney, Agent, or Firm*—Stroock & Stroock & Lavan, LLP

(57) ABSTRACT

A polarized optical element is disclosed comprising an upper portion and a lower portion defined at opposite parts with respect to a median line passing through the geometric center of the optical element, wherein: a) in the upper portion and at a distance of at least 10 mm from the median line the factor of luminous transmittance is between 3% and 20%; b) in the lower portion and at a distance of at least 10 mm from the median line the factor of luminous transmittance is between 15% and 65%; c) the ratio of the luminous transmittance measured in the lower portion at a distance of at least 10 mm below the median line and the luminous transmittance measured in the upper portion at a distance of at least 10 mm above the median line is not lower than 1.5; d) the colors of the upper and lower portions of the optical element are such that: d1) the absolute value of the difference between the value of the colorimetric coordinate a* of the upper portion measured at a point located 10 mm above the median line and the value of the colorimetric coordinate a* of the lower portion measured at a point located 10 mm below the median line is comprised between 0 and 60, d2) the absolute value of the difference between the value of the colorimetric coordinate b* of the upper portion measured at a point located 10 mm above the median line and the value of the colorimetric coordinate b* of the lower portion measured at a point located 10 mm below the median line is comprised between 0 and 60, e) the degree of polarization of the optical element is uniform both along a vertical and along a horizontal direction and is equal to at least 45% as measured according to European Standard EN 1836.

42 Claims, 6 Drawing Sheets

POLARIZED OPTICAL ELEMENT HAVING DIFFERENTIATED TRANSMITTANCE PROPERTIES FOR USE IN EYE-PROTECTING DEVICES

RELATED U.S. PATENT APPLICATIONS

This application claims the benefit of U.S. Provisional Application Ser. No. 60/689,742 filed on Jun. 10, 2005, entitled "POLARIZED OPTICAL ELEMENTS HAVING DIFFERENTIATED TRANSMITTANCE PROPERTIES FOR USE IN EYE-PROTECTING DEVICES", which is hereby incorporated in its entirety by reference.

FIELD OF THE INVENTION

In a general aspect, the present invention relates to a polarized optical element for use in eye-protecting devices such as eyeglasses, masks, visors and the like.

More particularly, the invention relates to a polarized transparent element for optical applications comprising an upper portion and a lower portion defined at opposite parts with respect to a median line passing through the geometric center of the optical element, said upper and lower portions having a different luminous transmittance.

The polarized optical element of the invention may be either a semi-finished product or blank from which it is possible to obtain by forming and possibly by beveling an ocular for eye-protecting devices, such as for instance a lens of any shape for eyeglasses, or a finished product, such as for instance an ocular in the form of lenses for eyeglasses, either ophthalmic or not, protection masks or portable shields, or in the form of a filter for photographic applications.

The invention also refers to any eye-protecting device comprising said polarized optical element.

In the following description and in the appended claims, the terms: eye-protecting device, and: ocular, are used to indicate elements suitable respectively to protect the eyes and to allow the vision, as defined by European Standard CEN EN 165.

In the following description and in the appended claims, the term: geometric center, is used to indicate the intersection of the diagonals of the smallest rectangle having at least one horizontal side and circumscribed to the optical element.

In the following description and in the appended claims, the term: median line of the optical element, is used to indicate a horizontal line passing through the geometric center.

BACKGROUND OF THE INVENTION

A first desired feature of optical elements for daily use, such as sunglass lenses, is the reduction of glare, which term refers to the presence of areas or "hot spots" in the field of vision which are of sufficient brightness to cause visual impediment, such as temporary blurring of vision, or ocular fatigue. Glare often occurs when a patch of bright light is reflected from smooth, shiny surfaces, such as water, snow, roadway or glass, into the eye.

A second desired feature of optical elements for daily use, such as sunglass lenses, is the accomplishment of a proper reduction of the visual discomfort which may arise when an object is focused alternately and repeatedly in the presence of an illumino-environmental contrast now limited now high, such as for instance the contrast which exists, respectively, between an object and the ground or an object and the sky that has in itself a markedly higher luminance.

In this regard, some experimental tests carried out by the Applicant in sunny conditions in a varied environment in the presence of vegetation and at the latitude of about 43° North, have shown that the luminance of the sky may be from 1.5 to about 9 times higher than the luminance of the ground.

In such circumstances, the eye must vary continuously the pupillary diameter, consequently adjusting the exposure of the retina to the external light, to face alternately high and low luminosity conditions.

In spite of the efforts of the eye to adapt itself to an average situation, which in any case would not allow an optimal vision, this brings about a visual stress that may lead to visual straining and in some cases also to a partial (even though reversible) damage of the receptors located on the retina.

Such unfavorable phenomenon is always present and particularly marked when playing some sports activities in which the athlete or the sportsman repeatedly passes from the observation of objects in a relatively little luminous field to the observation of objects that are in a markedly more luminous field.

In some circumstances, the visual discomfort to the eye may even be enhanced to levels which impair a good vision and cause great visual stress when an illumino-environmental contrast is coupled to the presence of glare or "hot spots". As can be easily understood, the stress generated to the eye is at a maximum level because the variation of pupillary diameter is forced not only when objects are alternately focused at different relative positions along a vertical direction, but also when they are alternatively focused against the ground in areas having different levels of glare along a horizontal direction.

Additionally, if a condition of relatively low diffused luminance but uniform glare is present at ground level, the eye will adapt itself to this illumination condition by lowering its sensitivity to take account of the glare with a consequent undesired loss of visual acuity.

An example of activity subjected to high visual stress due to the possible simultaneous presence of glare and of a marked illumino-environmental contrast, is driving a vehicle in bright sun conditions and alternately focusing the roadway and the instrumentation inside the vehicle.

Other examples of activities subjected to high visual stresses due to the particular illumination conditions described above are climbing in slopes with snow or climbing glaciers (the climber has continuously to look alternatively to the high glare ground and towards the summit with the sky as a background), or sailing (the skipper has the need of continuously looking alternatively to the sea surface or to objects having the sea surface as background and to the top of the sails with the sky as background).

PRIOR ART

Conventional non-polarized optical elements, for example sunglass lenses, fail to properly reduce the effects of glare, since they reduce uniformly the intensity of light throughout the visible spectrum. For example, if a hot spot is ten times brighter than the background ambient light, it will remain ten times brighter if a conventional optical element is used to reduce transmittance of the light, say by 50%. Therefore, conventional optical elements do not significantly eliminate the discomfort to the eye or the blurred vision resulting from the difference in the light intensity between the hot spot and the background.

In order to obviate this problem, the use of polarized optical elements has been suggested in the art.

Polarized optical elements, in fact, can reduce glare by optically filtering the polarized light significantly more than the non-polarized light. Directly reflected sunlight is partially polarized while ambient light is not, and therefore the transmittance of the reflected sunlight would be reduced much more than that of the ambient light, thereby reducing the discomfort to the eyes.

Generally, polarized optical elements such as polarized lenses are obtained by bonding a polarized film onto the plastic surface of the lens substrate or by introducing such a film into the plastics material of the lens substrate during polymerization or by applying a polarizing coating on a lens substrate. These methods, as well as alternative methods of producing polarized lenses, are disclosed for example in U.S. Pat. No. 6,650,473, the content of which is herein incorporated by reference. Regardless of which particular material is used for the substrate of the optical element, it is preferable in many applications to incorporate a polarizing film into the optical element.

Polarized optical elements, however, have a relatively flat transmission spectrum and thereby they are substantially ineffective in reducing the visual discomfort which may arise when an object is focused alternately and repeatedly in the presence of an illumino-environmental contrast now limited now high when the same is coupled to the presence of glare.

In order to somehow obviate this problem, it has been proposed in the art the adoption of a polarized optical element made of glass or plastics coated with a thin film made of metal (mirror coating) which is deposited under high vacuum and having a thickness progressively increasing from the geometric center to the upper portion of the element so as to generate a progressive reduction of the light transmittance.

An example of a polarized optical element of this kind is the lens marketed by Intercast Europe S.p.A. under the trade name of: Sinter 100 polar cast mir gradient silver.

This kind of coating, however, has a substantially uniform light absorption across the visible portion of the electromagnetic spectrum and, as such, is substantially unable to selectively absorb the light at the required different wavelengths, such as for example the blue light which is dominant in the sky, in order to reduce in the most effective way the visual discomfort due to a marked illumino-environmental contrast.

Additionally, the mirror-coated optical elements of this kind often show a heavy "mirror" effect due to the relatively high thickness of the metal coating necessary to achieve the required progressive reduction of the light transmittance in the upper portion, "mirror" effect which is undesirable both from an aesthetic and from a functional point of view.

On the other hand and in order to obviate the problem of visual discomfort due to a marked illumino-environmental contrast it has been suggested, as disclosed in U.S. Pat. No. 5,975,695, to impart specific spectral characteristics to the upper and lower portions of the optical element. More specifically, in the lower portion and at a distance of at least 10 mm from the median line, the factor of luminous transmittance is between 30% and 80%, while the curve of spectral transmittance as a function of the wavelength is such as to show: a minimum in a wavelength range of from 495 to 510 nm, an increase in spectral transmittance at wavelengths lower than 495 nm and higher than 510 nm, a maximum at a wavelength lower than 440 nm, and a reduction in the spectral transmittance as the wavelength decreases starting from said maximum; whereas in the upper portion and at a distance of at least 10 mm from the median line the factor of luminous transmittance is between 3% and 40%.

Optical elements of this kind, however, are not only substantially ineffective in reducing the visual discomfort in the presence of glare, but also substantially unable to cope with the diverse conditions of illumination and background color which may be encountered in use.

In conclusion, the optical elements of the prior art do not allow to effectively compensate the different luminance between a bright background and a darker background along a vertical direction against backgrounds of different colors and at the same time compensate the different luminance due to the glare along a horizontal direction with specific and optimized light filtration properties.

SUMMARY OF THE INVENTION

The present invention aims at providing an optical element which is both polarized to reduce glare and the associated eye fatigue and blurred vision when high intensity reflected light is present and which provides at the same time an effective reduction of the visual discomfort which may arise when an object is focused alternately and repeatedly in the presence of an illumino-environmental contrast now limited now high also against backgrounds of different colors.

The present invention overcomes the drawbacks of the cited prior art and achieves this object by providing a polarized lens having predetermined and different spectral characteristics in the lower and upper portions of the optical element.

According to a first aspect thereof, the present invention therefore relates to a polarized optical element as defined in attached claim 1.

According to the invention, it has in particular been found that the desired technical effect of a reduced glare coupled with a reduction of the visual discomfort due to the presence of a marked illumino-environmental contrast also against backgrounds of different colors, may be effectively achieved by a polarized optical element comprising an upper portion and a lower portion defined at opposite parts with respect to a median line passing through the geometric center of the optical element, wherein:

a) in the upper portion and at a distance of at least 10 mm from the median line the factor of luminous transmittance is between 3% and 20%;

b) in the lower portion and at a distance of at least 10 mm from the median line the factor of luminous transmittance is between 15% and 65%;

c) the ratio of the luminous transmittance measured in the lower portion at a distance of at least 10 mm below the median line and the luminous transmittance measured in the upper portion at a distance of at least 10 mm above the median line is not lower than 1.5;

d) the colors of the upper and lower portions of the optical element are such that:

d1) the absolute value of the difference between the value of the colorimetric coordinate a* of the upper portion measured at a point located 10 mm above the median line and the value of the calorimetric coordinate a* of the lower portion measured at a point located 10 mm below the median line is comprised between 0 and 60, d2) the absolute value of the difference between the value of the calorimetric coordinate b* of the upper portion measured at a point located 10 mm above the median line and the value of the colorimetric coordinate b* of the lower portion measured at a point located 10 mm below the median line is comprised between 0 and 60; and e) the degree of polarization of the optical element is uniform both along a vertical and along a horizontal direction and is equal to at least 45%.

For the purposes of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the present description and the appended claims, all distances are measured along the surface of the optical element and according to lines (meridians) perpendicular to the median line defined hereinabove.

In the following description and in the appended claims the term: spectral transmittance T or $\tau(\lambda)$, is intended to indicate the ratio, for a given wavelength ($\lambda$), of the spectral radiant flux transmitted by the optical element to the incident spectral radiant flux, according to European Standard CEN EN 165 point 2.123.

In the following description and in the appended claims, the term: factor of luminous transmittance or $\tau_v$, is intended to indicate the ratio of the luminous flux let through by the optical element in a wavelength range ($\lambda$) of from 380 and 780 nm, to the incident luminous flux in a wavelength range ($\lambda$) of from 380 and 780 nm, according to European Standard CEN EN 165 point 2.64.

Lastly, in the following description and in the appended claims, the colors of the upper and lower portions of the optical element are defined in the CIE Color Space using the colorimetric coordinates L*, a*, b* and the D65 as standard illuminant. The standard illuminant D 65 represents medium daylight conditions with the color temperature of 6500 K and is usually generated by the use of xenon lamps with filters.

According to the invention, it has been found that the above identified combination of features can optimize the perceptive capacity both by minimizing the visual stress caused by the observation through the upper portion of the optical element of an object against a background having a high luminosity, and by reducing or virtually eliminating the glare when an object is observed through the lower portion of the optical element against a background having a low luminosity but high level of glare.

Also, it has been found that thanks to the selection of a specific difference between the values of the calorimetric coordinates a*, b* of the upper portion and the values of the colorimetric coordinates a*, b* of the lower portion, the polarized optical element of the invention advantageously allows to cope with the diverse conditions of illumination and background color which may be encountered in use.

According to the invention, in fact, the color of the upper and lower portions of the optical element can advantageously be tuned, depending on the application requirements and on the average environmental conditions for the intended use, in order to have a substantially uniform color between the two portions with only a substantial variation of the level of "darkness" or, on the contrary, a substantially different color between the two portions together with a variation of the level of "darkness".

This possibility of having a selective visible light filtration allows to provide optical elements optimized not only in terms of luminance but also in terms of color which the achievement of important advantages also from the aesthetical point of view.

According to a preferred embodiment, the optical element has:

a) in the upper portion and at a distance of at least 10 mm from the median line a factor of luminous transmittance comprised between 5% and 20%;

b) in the lower portion and at a distance of at least 10 mm from the median line a factor of luminous transmittance comprised between 15% and 50%.

In accordance with the invention, the polarization characteristics of the optical element may be achieved in a number of ways.

In one preferred embodiment, the optical element comprises a polarizing film.

Preferably and as will be better apparent later on, one method for the manufacture of an optical element polarized in this way is a casting method.

In another preferred embodiment, the optical element comprises a polarizing coating.

In still another preferred embodiment, the polarized optical element comprises a polarizing material incorporated therein.

According to the invention, the polarized optical element has a degree of polarization P equal to at least 45% as measured according to European Standard EN 1836.

In the following description and in the appended claims, the term: degree of polarization P is defined as the percent ratio of the difference between the maximum and the minimum values of luminous transmittance as determined with linearly polarized radiation to the sum of the maximum and the minimum values of luminous transmittance as determined with linearly polarized radiation according to European Standard EN 1836.

It has been found that this feature can advantageously reduce or virtually eliminate the glare when an object is observed through the optical element against a background having a high level of glare.

More preferably, the polarized optical element has a degree of polarization P as measured according to European Standard EN 1836 comprised between 65% and 99.9%.

In this way, the aforementioned advantageous technical effect or glare reduction is optimized.

Preferably, the ratio between the factor of luminous transmittance of the lower portion and the factor of luminous transmittance of the upper portion of the optical element is between 1.5 and 7, more preferably between 2.5 and 6.5.

In this way, the optical element of the invention can advantageously drastically reduce the ratio between the luminance of the sky and the luminance of the ground: this effect coupled to the simultaneous reduction of the discomfort due to the glare carried out by the polarization characteristics, effectively reduces the visual stress ensuing from the repeated alternating observation of objects against backgrounds having a high and, respectively, a low luminance in presence of high level of glare.

In a preferred embodiment, the absolute value of the difference between the value of the calorimetric coordinates a*, b* of the upper portion measured at a point located 10 mm above the median line and the value of the colorimetric coordinates a*, b* of the lower portion measured at a point located 10 mm below the median line is comprised between 0 and 3, more preferably between 0 and 1.5.

In this way, it is advantageously possible to have substantially similar colors in the upper portion and in the lower portion of the polarized optical element, an arrangement which is particularly useful when the background color at the ground level is similar to the background color at the sky level (e.g. seaside environment)

In an alternative preferred embodiment, the absolute value of the difference between the value of at least one of the colorimetric coordinates a*, b* of the upper portion measured at a point located 10 mm above the median line and the corresponding value of the colorimetric coordinates a*, b* of the lower portion measured at a point located 10 mm below the median line is comprised between 3 and 60, more preferably between 8 and 60.

In this way, it is advantageously possible to have substantially different colors in the upper portion and in the lower portion of the polarized optical element, an arrangement which is particularly useful when the background color at the ground level is very different respect to the background color at the sky level (e.g. desert environment)

In a preferred embodiment, the polarized optical element of the present invention may possess suitable light-filtration characteristics which allow the element to also enhance visual acuity, intended as the capability of the eye to discriminate between very small and very close objects.

According to this preferred embodiment, the desired additional technical effect of an enhanced perception of visual acuity, may be effectively achieved by dyeing the optical element in such a way that the element exhibits a curve of spectral transmittance in a wavelength range comprised between 400 and 700 nm comprising:

i) at least one relative maximum at a wavelength comprised between 400 and 510 nm, and ii) at least one relative minimum at a wavelength comprised between 510 to 625 nm, wherein the ratio between the value of the factor of luminous transmittance at said at least one relative maximum and the value of the factor of luminous transmittance at said at least one relative minimum is of at least 1.3, and wherein the ratio between the value of the factor of luminous transmittance at a wavelength of 700 nm and the value of the factor of luminous transmittance at said at least one relative minimum is of at least 3.0.

In order to enhance visual acuity and as will be better apparent in the following, this embodiment of the invention advantageously exploits the higher sensitivity of the human eye to radiation having a wavelength around 550 nm, so that by reducing the amount of transmitted light within a relatively ample range around this wavelength will not significantly reduce the visibility of the corresponding colors (green-yellow), since the receptive system eye-brain is capable to adapt itself to this reduced energy.

Conversely, the increase of the factor of luminous transmittance in a wavelength range comprised between 400 and 510 nm and between 625 and 700 where the eye is less sensitive, is capable to amplify in a relative manner the corresponding colors (blue-green and orange-red) since the relative luminous energy is higher than that in the wavelength range where the eye sensitivity is at its maximum.

In other words, the selective reduction of the amount of light reaching the eye achieved by the invention will not significantly reduce the visibility of the colors (green and yellow) corresponding to the maximum eye sensitivity thanks to the perception characteristics of the eye/brain system, while the higher transmittance in the wavelength range where the eye is less sensitive (blue, blue-green, orange and red) and the associated higher relative energy reaching eye accounts for an enhancement of the perception of the corresponding colors.

The eye/brain system, in fact, adapts itself to light energy in a similar manner as the exposure system of a photographic camera, which adjusts the shutter speed and light aperture as a function of the light intensity in order to obtain a balanced color and contrast picture. Because of the photopic sensitivity of the eye, the intensity of light in the range of 530-595 weighs more and the eye/brain system adapts mostly to the energy reaching the eye in this range.

In other words, if the reduction of energy transmitted at the wavelengths corresponding to the "low sensitivity colors" (blue, blue-green, orange and red) is lower than the reduction of energy at the wavelengths corresponding to the "high sensitivity colors" (green and yellow), an enhanced perception of such low sensitivity colors can be obtained because the eye will be adapted to such a lower energy.

According to this preferred embodiment of the invention, this advantageous technical effect is in particular achieved thanks to a proper value (at least 1.3) of the ratio between the value of the factor of luminous transmittance at said at least one relative maximum and the value of the factor of luminous transmittance at said at least one relative minimum and to a proper value (at least 3.0) of the ratio between the value of the factor of luminous transmittance at a wavelength of 700 nm and the value of the factor of luminous transmittance at said at least one relative minimum.

Within the framework of this embodiment, the ratio between the value of the factor of spectral transmittance at said at least one relative maximum and the value of the factor of spectral transmittance at said at least one relative minimum is preferably comprised between 1.3 and 15 and, still more preferably, between 2 and 10.

Within the framework of this embodiment, furthermore, the ratio between the value of the factor of spectral transmittance at a wavelength of 700 nm and the value of the factor of spectral transmittance at said at least one relative minimum is preferably comprised between 3.0 and 20 and, still more preferably, between 5 and 15.

According to a preferred embodiment, particularly adapted for the manufacture of oculars suitable for climbing, the optical element has, at the median line passing through the geometric center, a factor of luminous transmittance, i.e. light transmission characteristics, substantially identical to those of the upper portion (3%-20%).

Preferably, the factor of luminous transmittance is substantially uniform along the median line.

In this way, it is optimized the vision of objects against a low luminance background with glare (iced ground), at a lower level than the geometric center of the ocular which, on the contrary, must allow an undisturbed vision of objects against a luminous background (summit and sky).

According to another preferred embodiment, particularly suitable for the manufacture of lenses or visors useful for practicing sailing or driving vehicles, the optical element has, at the median line passing through the geometric center, light transmission characteristics substantially identical to those of the lower portion (15%-65%).

Also in this case, the factor of luminous transmittance is preferably substantially uniform along the median line.

In this way, the vision of objects in the presence of low luminance at the geometric center of the lens is optimized, while ensuring at the same time an optimum vision of objects against a background having high luminance (sky).

According to a preferred embodiment, the factor of luminous transmittance of the upper portion is substantially uniform along each line parallel to the median line and progressively decreases moving away from the median line down to a value not lower than 3%.

In the alternative, and for the purpose of imparting particular functional characteristics to the ocular, the factor of luminous transmittance of the whole upper portion may be substantially uniform at any point of the same.

Preferably, the factor of luminous transmittance of the lower portion is substantially uniform starting from a distance of at least 10 mm from the median line or, alternatively, starting from the median line itself.

Preferably, the spectral transmittance of the optical element as a whole is substantially null at a wavelength equal to or lower than 400 nm, so as to prevent that dangerous ultraviolet radiations may harm the eye.

For the purposes of the invention, the optical element is preferably consisting of a substrate made of transparent plastics material or, alternatively, of a transparent inorganic material, such as for instance glass.

The plastic materials of most preferred and advantageous use are those selected from the group comprising: polymethyl methacrylate, polyol-allyl-carbonates, aromatic polycarbonates, polystyrene, cellulose esters, polyacrylates, polyalkylacrylates, polyurethanes, saturated and unsaturated polyesters, transparent polyamides, copolymers and co-blended polymers thereof.

Among them, diethylenglycol-bis-allyl-carbonate or CR39® and polycarbonate, commonly used for the manufacture of oculars, such as for instance lenses (either ophthalmic or not) for eyeglasses, and a polyureaurethane, available from Intercast Europe S.p.A. with the trade name of NXT®, are preferred.

In the alternative, the optical element may also be made of copolymers of the above polymers with other monomers suitable for the purpose, such as for instance, methyl-methacrylate, maleic anhydride, triallyl-cyanide or vinyl acetate.

According to the invention, the above described spectral characteristics of the lower and upper portions of the optical element may be obtained by incorporating therein or, alternatively, by incorporating in a protective film applied on the optical element, at least one light-filtering (dyeing) substance adapted to suitably filter the visible light or, alternatively, a mixture of light-filtering substances.

Examples of preferred dyeing substances that can be used to dye the optical element are Disperse and Soluble Dyes as described in the Color Index III Edition (Society of Dyers and Colorists, PO Box 244, Perkin House, 82 Grattan Road, Bradford BD1 2JB, England).

Disperse Dyes can be used to dye the polarized substrate on the surface and Soluble Dyes can be used when the substrate is dyed in bulk. Disperse Dyes and Soluble Dyes can also be used in combination.

Suitable dyeing substances or dyes preferably, but not exclusively, include dyeing substances comprising azobenzene or anthraquinone chromophore groups as defined in the Color Index.

Among them, preferred substances are those selected from the group comprising: 4-nitro-2'-methyl-4'-diethanolamino-2-phenoxy-1-hydroxy anthraquinone, 1-amino-2-phenoxy-4-hydroxy anthraquinone, 2-chloro-4-nitro-2'-methyl-4'-(1-cyanoethyl-ethylamino) azobenzene, 1-((2-hydroxyethyl)amino)-4-(methylamino)-anthraquinone (Disperse Blue 3), 1,4-Diaminoanthraquinone (Disperse Violet 1) N-{4-[(2-Hydroxy-5-methylphenyl)azo]phenyl}-acetamide (Disperse Yellow 3), 1-amino-4-hydroxy-anthraquinone (Disperse Red 15), 1,4-((2-hydroxyethyl)amino)-5,8-hydroxy-anthraquinone (Disperse Blue 7), 1-(4'-Nitrophenylazo)-2-methyl-4-bis-(beta-hydroxyethyl)aminobenzene (Disperse Red 17), and mixtures thereof.

Among the Disperse Dyes, Disperse Blue 7, Disperse Blue 3, Disperse Violet 1, Disperse Yellow 3 and Disperse Red 15, as defined by the Color Index, are preferred.

Among the Soluble Dyes, Solvent Green 3, Solvent Yellow 114, Solvent Blue 97, Solvent Violet 36, Solvent Orange 60, Solvent Yellow 93 and Solvent Red 52 as defined by the Color Index, are preferred.

In a preferred embodiment, the spectral characteristics of the upper portion may be obtained by incorporating in the polymer matrix of said portion or, alternatively, within a film applied to the same, one or more dyeing substances which may include dyeing substances different from the dyeing substances used to dye the lower portion and having substantially the same chemical nature, such as for instance those selected from the group comprising: 4-acetylamido-2'-hydroxy-5'-methyl azobenzene, N-(p-hydroxyphenyl)-2,4-nitroaniline, and mixtures thereof, and 1,4-(1-hydroxyethylamino)-5,8-hydroxy anthraquinone, 1-(p-hydroxyethylanilino)-4,5-hydroxy-8-nitro anthraquinone, 1-methylamino-4-hydroxyethylamino anthraquinone, and mixtures thereof.

The aforementioned dyeing substances may be incorporated in the polymer matrix of the optical element or, alternatively, within a film applied to the same by means of processes known in the art.

Preferably, the dyeing substance or the mixture of dyeing substances suitable to impart the desired spectral characteristics to the lower part of the optical element are first incorporated in the same, for instance by adding such dyeing substance or mixture of dyeing substances to the polymer material, and then by extruding or molding the latter, to obtain an optical element (sheet, visor, lens etc.) having a predetermined shape and thickness.

In the alternative, a preliminary molding step of the optical element free from dyeing substances may be carried out followed afterwards by a subsequent step of introducing within the same the dyeing substance or mixture of dyeing substances, for instance by means of the well known techniques of thermal transfer either in liquid or in vapor phase.

Advantageously, the technique of thermal transfer in liquid phase may be carried out by first immersing the optical element, for instance made of CR39®, into an aqueous solution including the appropriate dyeing substances that are incorporated within the polymer matrix.

Advantageously, the technique of thermal transfer in vapor phase allows to treat only one surface of the optical element, for instance the front one, while imparting to the other surface different properties, for instance by applying a film of an antifogging material.

Preferably, the thermal transfer in vapor phase of the dyeing substance or mixture of dyeing substances may be performed using the known printing process called "thermal transfer", consisting in impregnating an absorbent paper substrate with the filtering substance, transferring the impregnated substrate onto the optical element, and causing the filtering substance to evaporate in hot air, with ensuing incorporation of the same within the optical element.

At the end of this first treatment step, a subsequent step is carried out in which the dyeing substance or mixture of dyeing substances suitable to impart the desired characteristics of light transmission to the upper portion are introduced within the latter.

This step may be carried out by means of processes well known in the art, for instance by dipping the upper part of the previously treated optical element in an aqueous solution including appropriate dyeing substances having chromophore groups adapted to impart the desired transmission curve to the upper portion of the element.

In a preferred embodiment, the optical element is raised from the bath at a pre-fixed speed, so as to vary, section by section, the immersion times and to obtain a shaded off upper portion having an increasingly lower factor of luminous transmittance as one approaches the upper edge of the optical element.

The position of the shading off starting line may be either above or below the median line of the optical element and can be easily determined by those skilled in the art.

In a preferred embodiment and in order to avoid that the harmful ultraviolet radiations may reach the eye, the optical part further comprises at least one ultraviolet absorber, such as one of those available on the market and suitable for the purpose.

According to the invention, the optical element may be either a semi-finished product, such as an un-cut lens blank, from which it is possible to obtain by shaping and, possibly, by beveling an ocular of any shape, or a finished product, such as for instance an ocular for eye-protecting devices, a filter for photographic applications, etc.

As said above, the term: ocular, is used herein to indicate an element suitable to allow vision, such as for instance a lens for eyeglasses, a visor, a protection mask or a portable screen, according to the provisions of European Standard CEN EN 165.

If the optical element is a finished product, it may be obtained starting from a respective blank by means of shaping and possibly by beveling operations known per se, or by injection molding.

According to a further aspect, the invention also relates to an eye-protecting device adapted to reduce glare and optimize the capacity of perceiving objects either static or moving relatively to the perceiving subject, and observed alternately against a background having high and respectively low luminosity, and comprising a polarized optical element as described hereinabove.

According to a first embodiment, such eye-protecting device is essentially constituted by eyeglasses comprising a supporting frame wherein a couple of polarized lens-shaped oculars are mounted.

The polarized lens-shaped oculars may be ophthalmic lenses, i.e. capable of correcting sight defects, or devoid of any corrective capacity.

According to a second embodiment, such eye-protecting device comprises a polarized ocular in the form of a polarized visor or unitary lens, comprising an upper edge, a lower edge, as well as first and second lens portions, formed on opposite parts of a groove centrally formed in said lower edge.

The present invention is also directed toward methods for manufacturing the polarized optical elements described above. Preferred methods are defined in attached claims 30-41 the content of which is herein integrally incorporated by reference.

The exemplary manufacturing methods may yield a finished product ready for an intended optical application. Alternatively, they may yield a polarized optical element in preparation for further processing into another shape or for incorporation into a larger instrument or system. For example, the methods described below illustrates steps that can be used to form a finished polarized optical element ready for final insertion into an eyeglass frame, helmet or goggle; a prescription or non-prescription polarized lens blank to be edged to final shape and inserted into a frame; or a semi-finished polarized lens blank to be surfaced, polished and edged to a final prescription and shape before being inserted into frames. Similarly, optical elements for displays or windows could be prepared to final shape and size, or manufactured via the methods described below as large parts that are subsequently cut, shaped, formed or further processed to final articles.

For the purposes of the invention, polarized optical elements can be produced by a variety of methods such as for example by bonding a polarized film onto the surface of the substrate, preferably a plastics material, which constitutes the optical element or by introducing such a film into the plastics material of the substrate during polymerization of the same or by applying a polarizing coating on the substrate.

According to the invention, one method for manufacturing a polarized optical element comprising an upper portion and a lower portion defined at opposite parts with respect to a median line passing through the geometric center of the optical element, is a casting method which generally comprises placing a polarizing film preformed to have a curved surface, preferably a substantially spherical surface, in a cavity formed by molds, preferably made of glass, having concave and convex inner surfaces. A polymerizable plastic monomer, for example, diethylene glycol biscarbonate or polyurethane resin forming materials, is then injected on opposite sides of the polarizing film and then polymerized.

According the invention, a preferred casting method is defined in attached claim 30 and comprises the steps of:
  providing an optical element made of a transparent plastics material;
  applying a polarizing coating on at least one surface of the optical element;
  bonding the polarizing coating to said at least one surface of the optical element so as to obtain a degree of polarization which is uniform both along a vertical and along a horizontal direction and is equal to at least 45% as measured according to European Standard EN 1836;
  dyeing said optical element in such a way that:
    a) in the upper portion and at a distance of at least 10 mm from the median line the factor of luminous transmittance is between 3% and 20%;
    b) in the lower portion and at a distance of at least 10 mm from the median line the factor of luminous transmittance is between 15% and 65%;
    c) the ratio of the luminous transmittance measured in the lower portion at a distance of at least 10 mm below the median line and the luminous transmittance measured in the upper portion at a distance of at least 10 mm above the median line is not lower than 1.5; and
    d) the colors of the upper and lower portions of the optical element are such that:
      d1) the absolute value of the difference between the value of the calorimetric coordinate a* of the upper portion measured at a point located 10 mm above the median line and the value of the colorimetric coordinate a* of the lower portion measured at a point located 10 mm below the median line is comprised between 0 and 60,
      d2) the absolute value of the difference between the value of the colorimetric coordinate b* of the upper portion measured at a point located 10 mm above the median line and the value of the colorimetric coordinate b* of the lower portion measured at a point located 10 mm below the median line is comprised between 0 and 60.

A press molding method can also be used, in which thermoplastic sheets having different thicknesses are placed on opposite sides of a polarizing film, compressed and thermoformed in a curved, preferably substantially spherical, shape.

Alternatively, an injection molding method can be used, inserting in the mold a curved disk made of a polarizing sheet and than injecting the thermoplastic resin (such as for example polycarbonate or polyamide) in order to obtain a lens with the polarizing film directly bonded on the surface.

Alternatively, a polarized optical element, such as a polarized polycarbonate lens, can be produced by stacking a polarizing film and polycarbonate films or sheets with the polarizing film disposed between the polycarbonate films to thereby provide a laminate having a thickness of for example 0.5 to 2.5 mm, which is then hot-molded under pressure.

In an alternative preferred method, a polarizing coating comprising a layer of a dichroic polarizing laquer may be applied on at least one surface of the optical element as disclosed in U.S. Pat. No. 4,648,925, the content of which is herein incorporated by reference.

Preferably, the method further comprises in this case the step of treating said at least one surface of the optical element to form a plurality of microgrooves prior to applying the dichroic polarizing laquer on said at least one surface of the optical element. Preferably, the treating step is carried out by unidirectionally scrubbing the surface of the optical element so as to obtain microgrooves which provide for a liquid crystals alignment.

The optical element can be dyed prior to, simultaneously with or after the application or incorporation of the polarizing coating or film. When the optical element is dyed, light optical filtering substances may be incorporated into the polymer matrix of the optical element.

The optical element may be dyed using a variety of methods known in the art. One such method is dip dying the optical element in an aqueous bath using Disperse Dyes. Another method is adding Soluble Dyes to the mass of plastics material prior to producing the lens.

In a preferred embodiment, the dyeing step of the optical element may be carried out by introducing into the transparent plastics material at least one suitable dyeing substance, for example preferably comprising azobenzene or anthraquinone chromophore groups.

Advantageously, the aforementioned dyeing substances may be incorporated by means of thermal transfer techniques in liquid phase known per se in the art.

Preferably, the dyeing step of the optical element by means of the aforementioned techniques may be carried out by dipping the optical element, for instance made of a suitable plastics material such as CR39®, in an aqueous solution comprising at least one disperse dyeing substance.

Preferably, the aqueous solution is heated at a suitable temperature, so that the disperse dyeing substance(s) is(are) readily incorporated within the polymer matrix substantially by means of a diffusion mechanism.

Preferably, the aqueous solution is heated at a temperature comprised between 70° C. and 97° C., while the dipping time of the optical element is comprised between 20 and 120 minutes.

In a preferred embodiment, the dyeing step of the optical element is carried out by using at least one Disperse Dye selected among Disperse Blue 7, Disperse Blue 3, Disperse Violet 1, Disperse Yellow 3 and Disperse Red 15, in quantities adapted to obtain the desired spectral characteristics of the upper and lower portions of the optical element.

According to an additional aspect thereof, the invention also relates to a casting method for manufacturing a polarized optical element comprising an upper portion and a lower portion defined at opposite parts with respect to a median line passing through the geometric center of the optical element as is defined in attached claim 39.

This method comprises in particular the steps of:
providing a polarizing film that is preformed to have a curved surface;
placing the polarizing film in a cavity having a concave inner surface and a convex inner surface;
providing a mass of transparent plastics material;
dyeing the mass of transparent plastics material by means of at least one soluble dyeing substance in such a way that in the lower portion of the optical element and at a distance of at least 10 mm from the median line the factor of luminous transmittance is comprised between 15% and 65%;
forming a polarized optical element by injecting in said cavity said mass of dyed transparent plastics material;
dyeing the upper portion of said optical element in such a way that:
a) in the upper portion of the optical element and at a distance of at least 10 mm from the median line the factor of luminous transmittance is comprised between 3% and 20%;
b) the colors of the upper and lower portions of the optical element are such that:
b1) the absolute value of the difference between the value of the colorimetric coordinate a* of the upper portion measured at a point located 10 mm above the median line and the value of the calorimetric coordinate a* of the lower portion measured at a point located 10 mm below the median line is comprised between 0 and 60,
b2) the absolute value of the difference between the value of the calorimetric coordinate b* of the upper portion measured at a point located 10 mm above the median line and the value of the colorimetric coordinate b* of the lower portion measured at a point located 10 mm below the median line is comprised between 0 and 60, wherein the ratio of the luminous transmittance measured in the lower portion at a distance of at least 10 mm below the median line and the luminous transmittance measured in the upper portion at a distance of at least 10 mm above the median line is not lower than 1.5; and wherein the degree of polarization of the optical element is uniform both along a vertical and along a horizontal direction and is equal to at least 45% as measured according to European Standard EN 1836.

According to this embodiment of the invention, therefore, the optical element is manufactured by firstly incorporating in the transparent plastics material at least one soluble dyeing substance adapted to impart to the lower portion of the same the desired spectral characteristics, then forming the optical element having a suitable shape and size, for example by injection molding and finally by dyeing the upper portion so as to achieve the desired spectral and color characteristics of the optical element as a whole.

Preferably, the dyeing step of the mass of transparent plastics material is carried out by incorporating into the plastics material at least one soluble dyeing substance comprising azobenzene or anthraquinone chromophore groups.

In a preferred embodiment, the dyeing step the mass of transparent plastics material is carried out by incorporating into the plastics material at least one soluble dye selected among the Dyes indicated by the Color Index as "Solvent Dyes" such as for example Solvent Green 3, Solvent Yellow 114, Solvent Blue 97, Solvent Violet 36, Solvent Orange 60, Solvent Yellow 93 and Solvent Red 52.

Also in this case, the solvent dyes are incorporated in the transparent plastics material in quantities suitable to achieve the desired spectral characteristics of the upper and lower portions of the optical element.

According to this embodiment of the invention, the upper portion of the optical element may be dyed using one of the methods indicated hereinabove for introducing into the transparent plastics material at least one suitable dyeing substance selected from the Disperse Dyes. One preferred method is dip dying the optical element in an aqueous bath.

Additional objects, features and advantages of the present invention will become more readily apparent from the following non-limitative examples thereof, given hereinbelow for illustration purposes with reference to the accompanying drawing figures. It is to be understood, however, that the following examples and drawings are intended solely for the purpose of illustration and not as a definition of the limits of the invention, for which reference should be made to the appended claims.

BRIEF DESCRIPTION OF THE DRAWINGS

In the drawing figures, which are merely illustrative.

DETAILED DESCRIPTION OF PREFERRED EMBODIMENTS

Figure 1:
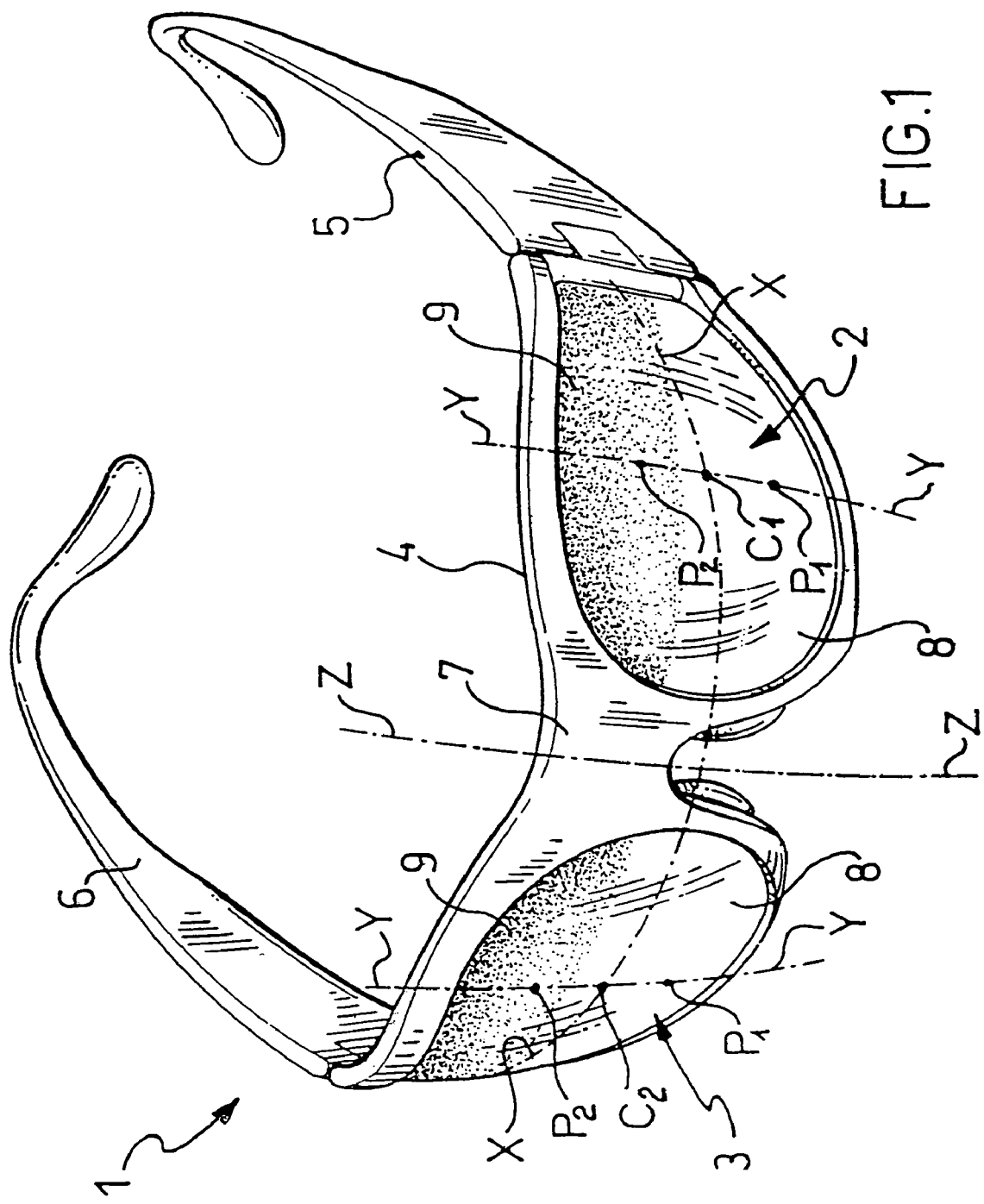
FIG. 1 shows a perspective view of eyeglasses including a couple of lens-shaped optical elements according to the invention.
Figure 2:
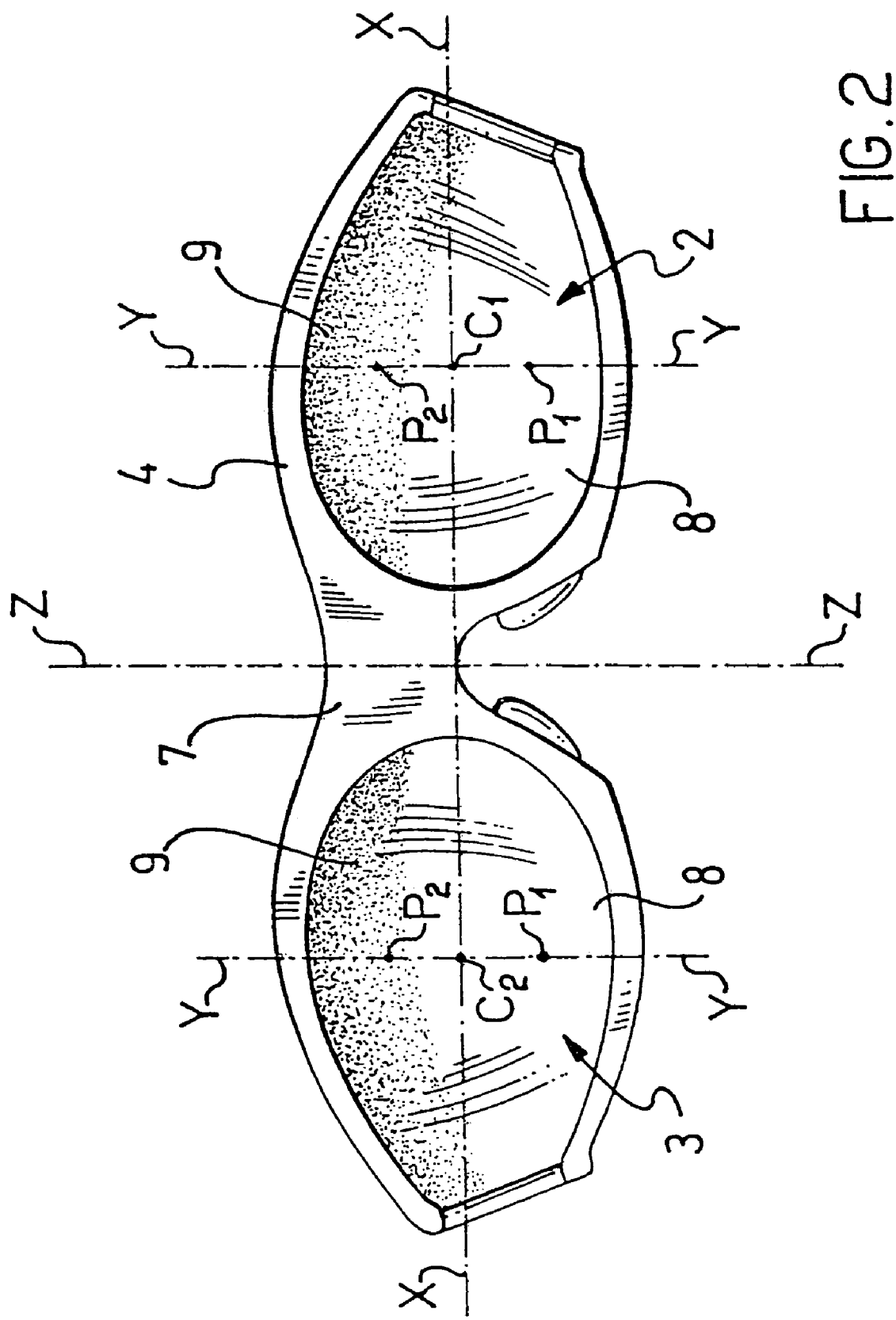
FIG. 2 shows a front elevational view of the eyeglasses of FIG. 1.

With reference to FIGS. 1-2, an eye-protecting device according to a first preferred embodiment of the invention and, more specifically, sports eyeglasses which are especially suitable for driving vehicles, is generally indicated at 1.

The eyeglasses 1 comprise a couple of polarized lenses 2, 3—constituting as many polarized optical elements in the form of polarized oculars according to the invention—conventionally supported by a frame 4 to which two temples 5, 6 are hinged.

The polarized lenses 2, 3, having a specular shape with respect to a vertical symmetry plane z-z passing through the middle of a bridge 7 of the frame 4, may be obtained by means of conventional shaping and beveling operations from a polarized semi-finished product or lens blank having a predetermined bending radius, or by injection molding.

Each one of the polarized lenses 2, 3 comprises a lower portion 8 and an upper portion 9, defined at opposite parts with respect to a median line x-x passing through the geometric centers C1, C2 of each lens.

Within the framework of the present description and the appended claims, the geometry of each polarized lens or, more generally, of each polarized optical element is as defined by European Standard CEN EN 165.

On the basis of such Standard, the geometric center and the median line of the optical element are as defined hereinabove, while the meridian line is the line perpendicular to the median line passing through the geometric center.

In this embodiment of the invention, the spectral transmittance of the lower portion 8 is substantially identical in all the points of the same and is equal to the one measured at a reference point P1 positioned at a distance—along the meridian line y-y of the lenses—of at least 10 mm from the median line.

In this embodiment, both the polarized lenses 2, 3 comprise an upper portion having a color shade such that its factor of luminous transmittance progressively decreases moving away from said median line, down to a value not lower than 3%.

Besides, the optical centers C1 and C2 of the polarized lenses 2 and 3 are both located outside of the shaded part and have spectral transmittance characteristics almost identical to those of the lower portion 8, described hereinabove.

Figure 3:
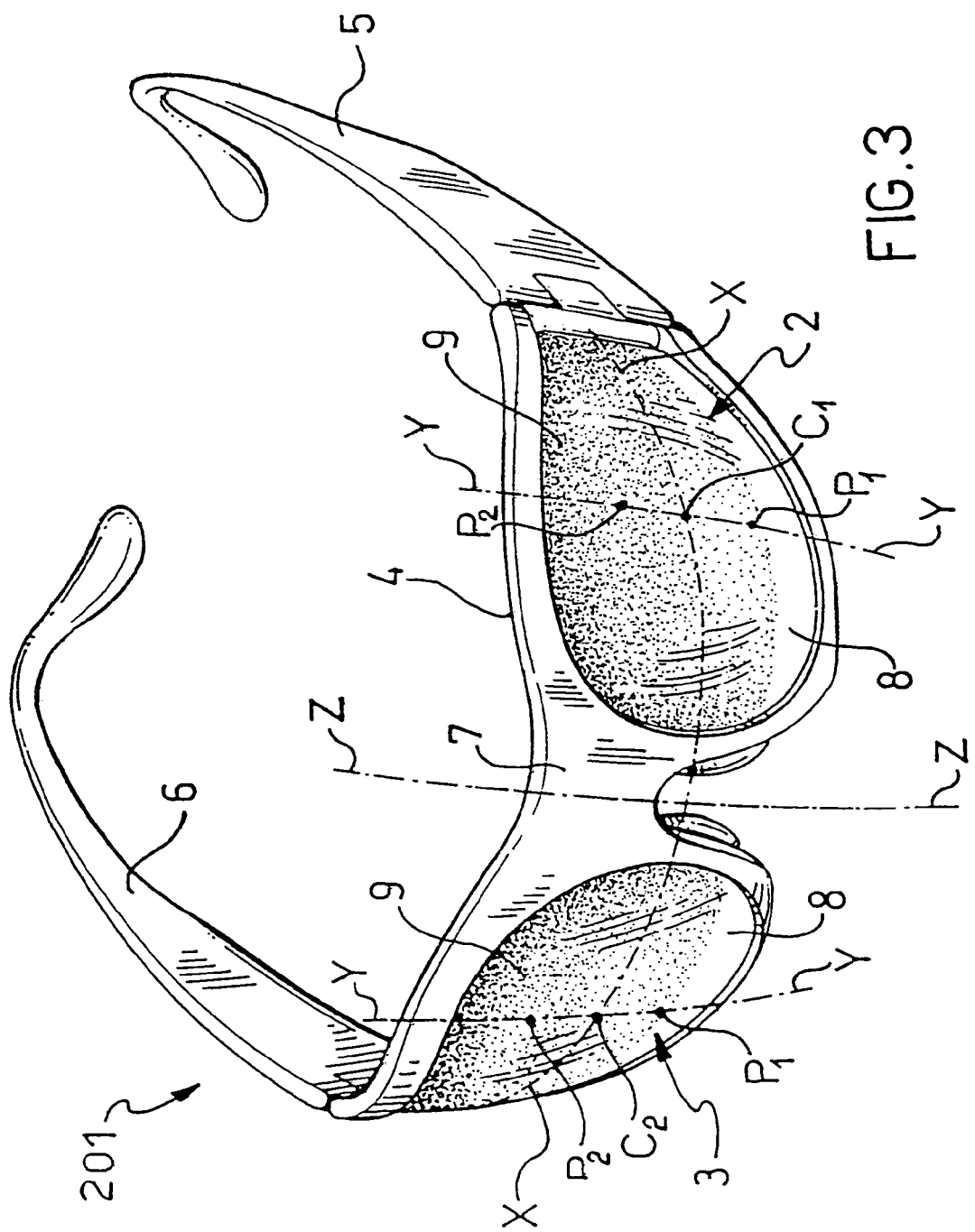
FIG. 3 shows a perspective view of eyeglasses comprising a couple of lens-shaped optical elements according to an alternative embodiment of the invention.

FIG. 3 shows a second preferred embodiment of the invention and in particular eyeglasses 201 comprising a couple of polarized lenses wherein the color shade extends in part also in the lower portion of the latter.

In the following of description and in such figures, the elements of eyeglasses 201 structurally or functionally equivalent to those illustrated hereinabove with reference to FIGS. 1-2, will be indicated by the same numerals and will be not further described.

In the embodiment shown in FIG. 3, particularly suitable for driving vehicles during the daylight, both the polarized lenses 2, 3 of the eyeglasses 201 comprise a color shade extending along the whole upper portion 9 and part of the lower portion 8.

Preferably, the factor of luminous transmittance of the upper portion 9 is substantially uniform along lines parallel to the median line x-x and progressively decreases, moving away from a line parallel to the median line and located under point P1, from a value of 40% down to a value of 8%.

The optical centers C1 and C2 of lenses 2 and 3 are both located within the shaded off part and at said centers the spectral transmittance falls again within the field of values indicated hereinabove.

Some non limiting examples illustrating the manufacture of a polarized optical element according to the invention will be given by way of indication in the following.

Unless otherwise specified, in such examples the various compositions are defined by indicating the parts by weight of each component.

EXAMPLE 1

Invention

A polarized lens made of diethylenglycol-bis-allyl-carbonate (CR39®) was obtained by means of a casting method comprising placing a polarizing disc made of a polyvinylalcohol film 30 microns thick (Kurarai, J P) preformed to have a substantially spherical surface in a cavity formed by molds having concave and convex inner surfaces. A solution of transparent polymerizable diethylenglycol-bis-allyl-carbonate monomer including 3% of cross-linking catalyst (diisopropyl peroxy dicarbonate) and 0.3% of UV absorber Uvinul® 3049 (BASF) was then poured on opposite sides of the polarizing film and then polymerized. The polymerization cycle lasted 20 hours and the temperature was adjusted between 40° and 80° C. according to polymerization procedures well known to those skilled in the art.

The polarizing disk has the following values of the factor of luminous transmittance and the following colorimetric details:

factor of luminous transmittance ($\tau_v$)=33%, color: Grey, L*=62, a*=−2.67, b*=−0.08

The polarized lens thus obtained was dyed by means of a thermal transfer technique in liquid phase. To this end, a dyeing bath was prepared comprising an aqueous solution including: Disperse Blue 7, Disperse Red 15 and Disperse Yellow 3. The tinting bath was prepared adding the water, heating to 95° C. and adding the dyes and allowing a good dispersion and dissolution of the dyes.

The lens was kept immersed for about 15 min, so as to obtain a factor of luminous transmittance of about 28%.

Figure 4:
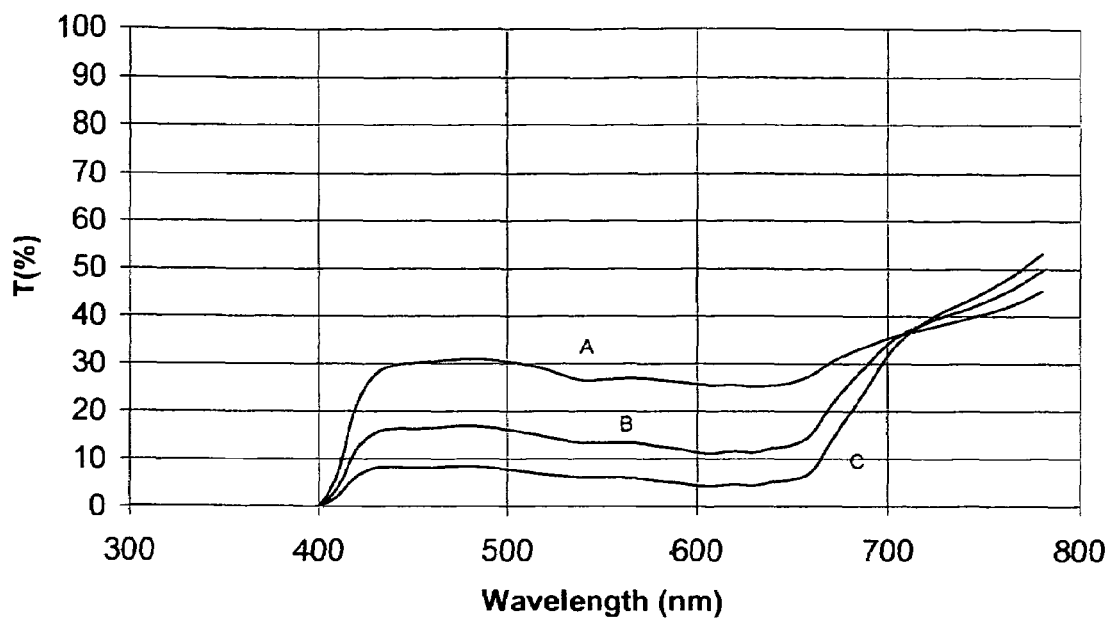
FIG. 4 shows—within a system of Cartesian coordinates having in the abscissa the wavelengths and in the ordinate the spectral transmittance—as many curves of the spectral transmittance of the lower, central and respectively the upper portion of an optical element according to a first preferred embodiment the present invention.

The spectral characteristics at the different wavelengths as measured at a reference point located in the lower portion of the lens at a distance of about 10 mm from the median line are illustrated by curve A of FIG. 4.

A part of the upper portion of the so treated lens was afterwards immersed, starting from a distance of about 5 mm above the median line of the same, into a second aqueous bath comprising: Disperse Blue 7, Disperse Red 15 and Disperse Yellow 3.

The lens was gradually raised at a speed of 1 mm/min, so as to obtain a treatment intensity increasingly marked towards the upper end of the same.

Depending on the color nuance or shading off so obtained, the factor of luminous transmittance changed from 28% at a reference point located at about 10 mm above the median line down to 7% near the upper edge of the lens blanks.

The curve of spectral transmittance obtained is shown in FIG. 4. In FIG. 4, curve A graphically shows the spectral transmittance in the lower portion of the optical element as measured at a reference point located at 10 mm below the median line, curve B graphically shows the spectral transmittance at the median line and curve C graphically shows the spectral transmittance in the upper portion of the optical element as measured at a reference point located at 10 mm above the median line.

All the reference points were aligned along the meridian line of the lens.

The values of the factor of luminous transmittance and the calorimetric details were the following:

Upper portion (UP): $\tau_v$=7%, color: Blue, L*=29, a*=−1.8, b*=−7.2

Lower Portion (LP): $\tau_v$=28%, color: Grey, L*=59, a*=−2.1, b*=−2.8

Ratio between the factors of luminous Transmittance of the upper and of the lower portions (UP/LP)=4.

EXAMPLE 2

Invention

A polarized CR39® lens was manufactured in the same way as of Example 1 except for the fact that the dyeing conditions were set so as to obtain different spectral characteristics in the upper and lower portions of the optical element.

Figure 5:
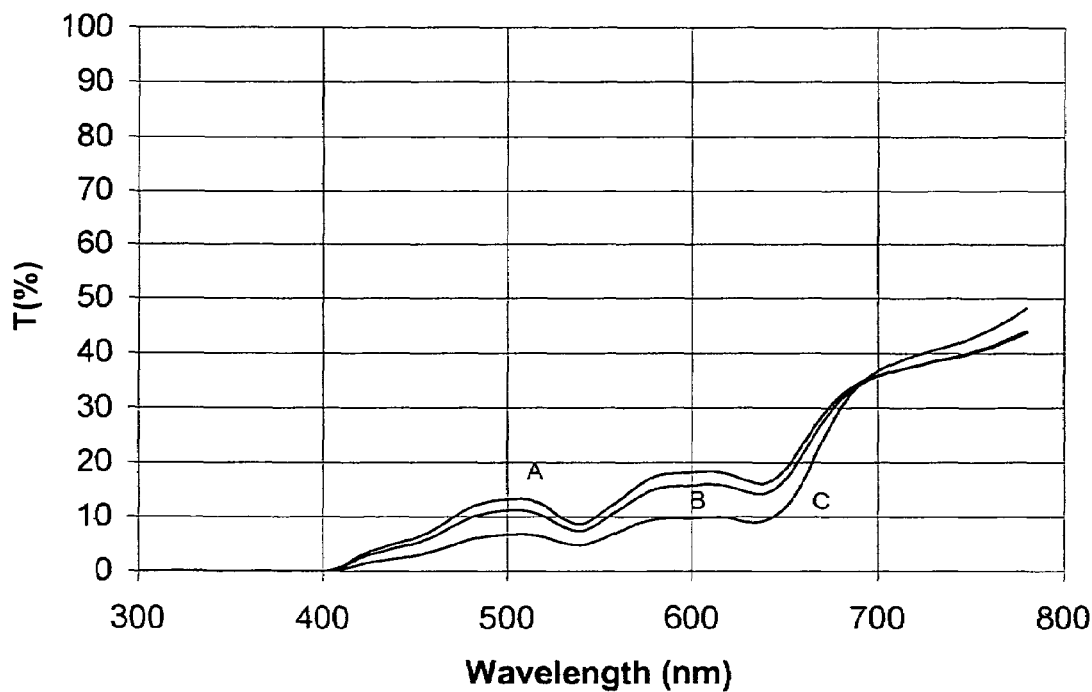
FIG. 5 shows—within a system of Cartesian coordinates having in the abscissa the wavelengths and in the ordinate the spectral transmittance—as many curves of the spectral transmittance of the lower, central and respectively the upper portion of an optical element according to a second preferred embodiment the present invention.

The curve of spectral transmittance obtained is shown in FIG. 5. In FIG. 5, curve A graphically shows the spectral transmittance in the lower portion of the optical element as measured at a reference point located at 10 mm below the median line, curve B graphically shows the spectral transmittance at the median line and curve C graphically shows the spectral transmittance in the upper portion of the optical element as measured at a reference point located at 10 mm above the median line.

All the reference points were aligned along the meridian line of the lens.

The values of the factor of luminous transmittance and the colorimetric details were the following:

Upper portion (UP): $\tau_v$=8%, color: Brown, L*=33, a*=6.2, b*=18.8

Lower Portion (LP): $\tau_v$=15%, color: Brown, L*=44, a*=5.8, b*=19.4

Ratio between the factors of luminous Transmittance of the upper and of the lower portions UP/LP=1.9

EXAMPLE 3

Invention

A polarized CR39® lens was manufactured in the same way as of Example 1 except for the fact that the dyeing conditions were set so as to obtain different spectral characteristics in the upper and lower portions of the optical element.

Figure 6:
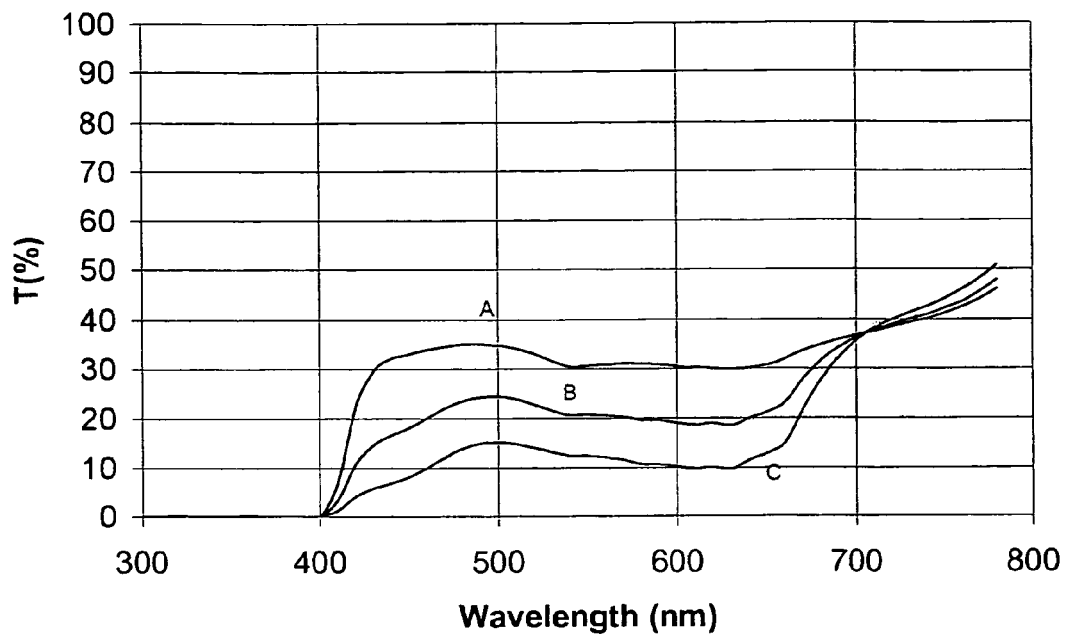
FIG. 6 shows—within a system of Cartesian coordinates having in the abscissa the wavelengths and in the ordinate the spectral transmittance—as many curves of the spectral transmittance of the lower, central and respectively the upper portion of an optical element according to a third preferred embodiment the present invention.

The curve of spectral transmittance obtained is shown in FIG. 6. In FIG. 6, curve A graphically shows the spectral transmittance in the lower portion of the optical element as measured at a reference point located at 10 mm below the median line, curve B graphically shows the spectral transmittance at the median line and curve C graphically shows the spectral transmittance in the upper portion of the optical element as measured at a reference point located at 10 mm above the median line.

All the reference points were aligned along the meridian line of the lens.

The values of the factor of luminous transmittance and the calorimetric details were the following:

Upper portion (UP): $\tau_v$=12%, color: Green, L*=41, a*=−10.2, b*=8.6.

Lower Portion (LP): $\tau_v$=31%, color: Grey, L*=62, a*=−2.3, b*=−0.7

Ratio between the factors of luminous Transmittance of the upper and of the lower portions UP/LP=2.6

EXAMPLE 4

Invention

A polarized CR39® lens was manufactured in the same way as of Example 1 except for the fact that a dyeing bath was prepared comprising an aqueous solution including: Disperse Blue 3, Disperse Red 15, Disperse Violet 1 and Disperse Yellow 3.

Also the dyeing conditions were set so as to obtain different spectral characteristics in the upper and lower portions of the optical element and to achieve the additional technical effect of an enhanced perception of chromatic contrast and thus of an enhanced visual acuity.

Figure 7:
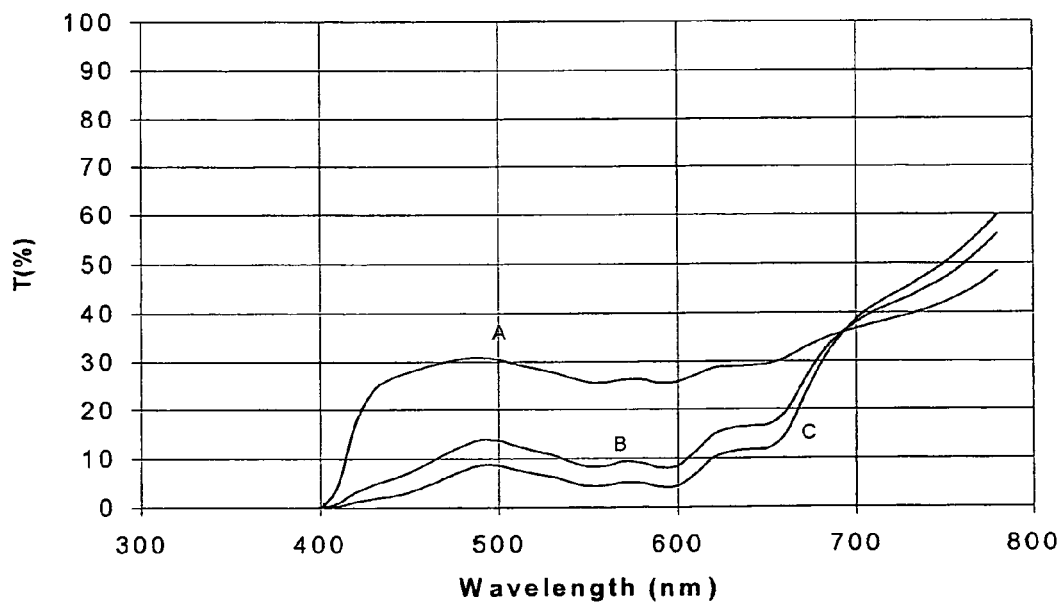
FIG. 7 shows—within a system of Cartesian coordinates having in the abscissa the wavelengths and in the ordinate the spectral transmittance—as many curves of the spectral transmittance of the lower, central and respectively the upper portion of an optical element according to a fourth preferred embodiment the present invention.

The curve of spectral transmittance obtained is shown in FIG. 7. In FIG. 7, curve A graphically shows the spectral transmittance in the lower portion of the optical element as measured at a reference point located at 10 mm below the median line, curve B graphically shows the spectral transmittance at the median line and curve C graphically shows the spectral transmittance in the upper portion of the optical element as measured at a reference point located at 10 mm above the median line.

All the reference points were aligned along the meridian line of the lens.

The values of the factor of luminous transmittance and the colorimetric details were the following:

Upper portion (UP): $\tau_v$=7%, color: Brown, L*=30, a*=2.4, b*=9.4

Lower Portion (LP): $\tau_v$=32%, color: Grey, L*=60, a*=−1.2, b*=0.3

Ratio between the factors of luminous Transmittance of the upper and of the lower portions UP/LP=4.6

EXAMPLE 5

Invention

A polarized lens made of a polyurethane resin called NXT®D (Intercast Europe) was obtained by means of a method such as one of those described in U.S. Pat. No. 6,127,505 the content of which is herein incorporated by reference, comprising cross-linking a polyurethane prepolymer (in this case obtained from methylenebis(cyclohexyl isocyanate)) and a polyester glycol prepared from adipic acid and 1,6-hexanediol (equivalent weight: 500, Ruco Polymer Corporation), with diethylene toluen diamine (DEDTA), commercially available with the trade name of ETHACURE® 100 (Albemarle Corporation). The prepolymer was mixed with the following Solvent Dyes: 0.001% Green 3, 0.0002% Solvent Blue 97, 0.0003% Solvent Orange 60, 0.0004% Solvent Red 52 and 0.3% of the UV absorber Uvinul 3049 (BASF).

The mixture was injected in a glass mold containing a curved disc of polarizing film made of a pure polyvinylalcohol film sandwiched between two polycarbonate layers preformed to have a substantially spherical surface and put in an oven to harden. The polymerization cycle lasted 10 hours and the temperature was adjusted at 120° C. according to polymerization procedures well known to those skilled in the art.

The polarizing disk has the following value of the factor of luminous transmittance and the following colorimetric details:

factor of luminous transmittance ($\tau_v$)=34%, color: Grey, L*=65, a*=−2.3, b*=2.7

Figure 8:
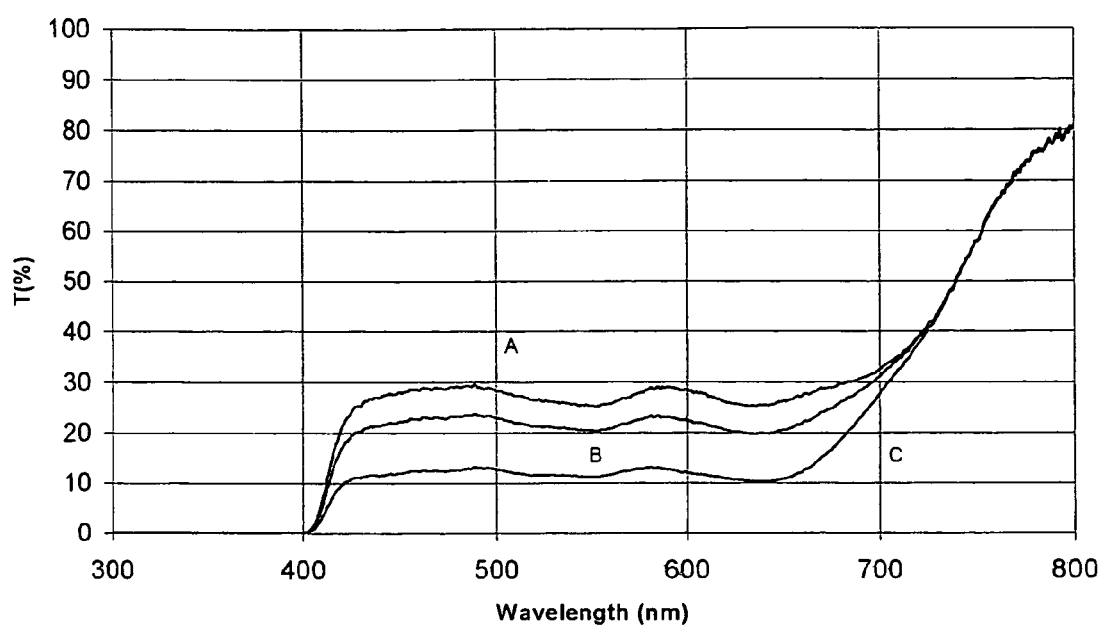
FIG. 8 shows—within a system of Cartesian coordinates having in the abscissa the wavelengths and in the ordinate the spectral transmittance—as many curves of the spectral transmittance of the lower, central and respectively the upper portion of an optical element according to a fifth preferred embodiment the present invention.

A part of the upper portion of the so obtained lens was afterwards immersed, starting from a distance of about 5 mm from the median line of the same, into a second aqueous bath comprising: Disperse Blue 7, Disperse Red 15 and Disperse Yellow 3. The tinting bath was prepared adding the water, heating to 95° C. and adding the dyes and allowing a good dispersion and dissolution of the dyes The curve of spectral transmittance obtained is shown in FIG. 8. In FIG. 8, curve A graphically shows the spectral transmittance in the lower portion of the optical element as measured at a reference point located at 10 mm below the median line, curve B graphically shows the spectral transmittance at the median line and curve C graphically shows the spectral transmittance in the upper portion of the optical element as measured at a reference point located at 10 mm above the median line.

All the reference points were aligned along the meridian line of the lens.

The values of the factor of luminous transmittance and the colorimetric details were the following:

Upper portion (UP): $\tau_v$=12%, color: Grey, L*=41, a*=−0.5, b*=0.6

Lower Portion (LP): $\tau_v$=27%, color: Grey, L*=59, a*=0.5, b*=0.0

Ratio between the factors of luminous Transmittance of the upper and of the lower portions UP/LP=2.3

Tests carried out with the aforementioned lenses and with oculars incorporating different dyeing substances and manufactured using other substrates have shown that—whenever the ocular possessed the spectral characteristics described hereinabove—a substantial reduction of the visual stresses due to the glare and to the observation of objects alternately against a background having high and respectively low luminosity, was achieved.

Obviously, those skilled in the art may introduce modifications and variants in order to satisfy specific and contingent application requirements, which modifications and variants fall anyhow within the protection scope as is defined by the appended claims.

What is claimed is:

1. A polarized optical element comprising an upper portion and a lower portion defined at opposite parts with respect to a median line passing through the geometric center of the optical element, wherein: a) in the upper portion and at a distance of at least 10 mm from the median line the factor of luminous transmittance is between 3% and 20%; b) in the lower portion and at a distance of at least 10 mm from the median line the factor of luminous transmittance is between 15% and 65%; c) the ratio of the luminous transmittance measured in the lower portion at a distance of at least 10 mm below the median line and the luminous transmittance measured in the upper portion at a distance of at least 10 mm above the median line is not lower than 1.5; d) the colors of the upper and lower portions of the optical element are such that: d1) the absolute value of the difference between the value of the colorimetric coordinate a* of the upper portion measured at a point located 10 mm above the median line and the value of the colorimetric coordinate a* of the lower portion measured at a point located 10 mm below the median line is comprised between 0 and 60, d2) the absolute value of the difference between the value of the colorimetric coordinate b* of the upper portion measured at a point located 10 mm above the median line and the value of the calorimetric coordinate b* of the lower portion measured at a point located 10 mm below the median line is comprised between 0 and 60, e) the degree of polarization of the optical element is uniform both along a vertical and along a horizontal direction and is equal to at least 45% as measured according to European Standard EN 1836.

2. The polarized optical element according to claim 1, comprising a polarizing film.

3. The polarized optical element according to claim 1, comprising a polarizing coating.

4. The polarized optical element according to claim 1, wherein a polarizing material is incorporated therein.

5. The polarized optical element according to claim 1, having a degree of polarization P as measured according to European Standard EN 1836 comprised between 65% and 99.9%.

6. The polarized optical element according to claim 1, wherein the ratio between the factor of luminous transmittance of the lower portion and the factor of luminous transmittance of the upper portion is comprised between 1.5 and 7.

7. The polarized optical element according to claim 1, wherein the absolute value of the difference between the value of the colorimetric coordinates a*, b* of the upper portion measured at a point located 10 mm above the median line and the value of the colorimetric coordinates a*, b* of the lower portion measured at a point located 10 mm below the median line is comprised between 0 and 3, more preferably between 0 and 1.5.

8. The polarized optical element according to claim 1, wherein the absolute value of the difference between the value of at least one of the two colorimetric coordinates a*, b* of the upper portion measured at a point located 10 mm above the median line and the value of the colorimetric coordinates a*, b* of the lower portion measured at a point located 10 mm below the median line is comprised between 3 and 60, more preferably between 8 and 60.

9. The polarized optical element according to claim 1, having a curve of spectral transmittance in a wavelength range comprised between 400 and 700 nm comprising: i) at least one relative maximum at a wavelength comprised between 400 and 510 nm, and ii) at least one relative minimum at a wavelength comprised between 510 to 625 nm, wherein the ratio between the value of the factor of luminous transmittance at said at least one relative maximum and the value of the factor of luminous' transmittance at said at least one relative minimum is of at least 1.3, and wherein the ratio between the value of the factor of luminous transmittance at a wavelength of 700 nm and the value of the factor of luminous transmittance at said at least one relative minimum is of at least 3.0.

10. The polarized optical element according to claim 1, wherein the factor of luminous transmittance at the median line passing through the geometric center is comprised between 3% and 20%.

11. The polarized optical element according to claim 1, wherein the factor of luminous transmittance at the median line passing through the geometric center is comprised between 15% and 65%.

12. The polarized optical element according to claim 1, wherein the factor of luminous transmittance of said upper portion is substantially uniform along each line parallel to the median line and progressively decreases moving away from said median line down to a value not lower than 3%.

13. The polarized optical element according to claim 1, wherein the factor of luminous transmittance of the whole upper portion is substantially uniform in each point of the same.

14. The polarized optical element according to claim 1, wherein the factor of luminous transmittance of said lower portion is substantially uniform starting from a distance of at least 10 mm from the median line.

15. The polarized optical element according to claim 1, wherein the factor of luminous transmittance of said lower portion is substantially uniform starting from said median line.

16. The polarized optical element according to claim 1, wherein the spectral transmittance is substantially null at a wavelength equal to or lower than 400 nm.

17. The polarized optical element according to anyone of the preceding claims, wherein optical element is essentially constituted by a substrate made of a transparent plastics material or a transparent inorganic material.

18. The polarized optical element according to claim 17, wherein said substrate made of transparent plastics material is selected from the group comprising: polymethyl methacrylate, polyol-allyl-carbonates, aromatic polycarbonates, polystyrene, cellulose esters, polyacrylates, polyalkylacrylates polyurethanes, saturated and unsaturated polyesters, transparent polyamides, copolymers and co-blended polymers thereof.

19. The polarized optical element according to claim 1, comprising at least one dyeing substance adapted to filter visible light.

20. The polarized optical element according to claim 19, wherein said at least one dyeing substance is a Disperse Dye or a Solvent Dye.

21. The polarized optical element according to claim 19, wherein said at least one dyeing substance comprises azobenzene or anthraquinone chromophore groups.

22. The polarized optical element according to claim 20 or 21, comprising at least one Disperse Dye selected among Disperse Blue 7, Disperse Blue 3, Disperse Violet 1, Disperse Yellow 3 and Disperse Red 15.

23. The polarized optical element according to claim 20 or 21, comprising at least one Soluble Dye selected among Solvent Green 3, Solvent Yellow 114, Solvent Blue 97, Solvent Violet 36, Solvent Orange 60, Solvent Yellow 93.

24. The polarized optical element according to claim 1, further comprising at least one ultraviolet absorber.

25. The polarized optical element according to claim 1, in the form of semi-finished product for the manufacture of oculars for eyeglasses.

26. The polarized optical element according to claim 1, in the form of an ocular.

27. The polarized optical element according to claim 26, wherein said ocular is a polarized lens for eyeglasses.

28. The polarized optical element according to claim 26, wherein said ocular is a polarized visor.

29. An eye-protecting device comprising a polarized optical element according to claim 26.

30. A method for manufacturing a polarized optical element comprising an upper portion and a lower portion defined at opposite parts with respect to a median line passing through the geometric center of the optical element, the method comprising the steps of: providing an optical element made of a transparent plastics material; applying a polarizing coating on at least one surface of the optical element; bonding the polarizing coating to said at least one surface of the optical element so as to obtain a degree of polarization which is uniform both along a vertical and along a horizontal direction and is equal to at least 45% as measured according to European Standard EN 1836; dyeing said optical element in such a way that: a) in the upper portion and at a distance of at least 10 mm from the median line the factor of luminous transmittance is between 3% and 20%; b) in the lower portion and at a distance of at least 10 mm from the median line the factor of luminous transmittance is between 15% and 65%; c) the ratio of the luminous transmittance measured in the lower portion at a distance of at least 10 mm below the median line and the luminous transmittance measured in the upper portion at a distance of at least 10 mm above the median line is not lower than 1.5; and d) the colors of the upper and lower portions of the optical element are such that: d1) the absolute value of the difference between the value of the colorimetric coordinate a* of the upper portion measured at a point located 10 mm above the median line and the value of the colorimetric coordinate a* of the lower portion measured at a point located 10 mm below the median line is comprised between 0 and 60, d2) the absolute value of the difference between the value of the calorimetric coordinate b* of the upper portion measured at a point located 10 mm above the median line and the value of the calorimetric coordinate b* of the lower portion measured at a point located 10 mm below the median line is comprised between 0 and 60.

31. A method according to claim 30, wherein said polarizing coating comprises a polarizing film.

32. A method according to claim 31, wherein said polarizing coating comprises a layer of a dichroic polarizing laquer.

33. A method according to claim 32, further comprising the step of treating said at least one surface of the optical element to form a plurality of microgrooves prior to applying the polarizing coating on said at least one surface of the optical element.

34. A method according to claim 30, wherein the dyeing step is carried out prior to the step of providing the optical element by: providing a mass of transparent plastics material; dyeing the mass of transparent plastics material by means of at least one soluble dyeing substance.

35. A method for manufacturing a polarized optical element comprising an upper portion and a lower portion defined at opposite parts with respect to a median line passing through the geometric center of the optical element, the method comprising the steps of: providing a polarizing film that is preformed to have a curved surface; placing the polarizing film in a cavity formed by molds having a concave inner surface and a convex inner surface; injecting a polymerizable plastic monomer on opposite sides of the polarizing film; polymerizing the polymerizable plastic monomer to form a polarized optical element made of a transparent plastics material and having a degree of polarization which is uniform both along a vertical and along a horizontal direction and is equal to at least 45% as measured according to European Standard EN 1836; dyeing said optical element in such a way that: a) in the upper portion and at a distance of at least 10 mm from the median line the factor of luminous transmittance is between 3% and 20%; b) in the lower portion and at a distance of at least 10 mm from the median line the factor of luminous transmittance is between 15% and 65%; c) the ratio of the luminous transmittance measured in the lower portion at a distance of at least 10 mm below the median line and the luminous transmittance measured in the upper portion at a distance of at least 10 mm above the median line is not lower than 1.5; d) the colors of the upper and lower portions of the optical element are such that: d1) the absolute value of the difference between the value of the colorimetric coordinate a* of the upper portion measured at a point located 10 mm above the median line and the value of the calorimetric coordinate a* of the lower portion measured at a point located 10 mm below the median line is comprised between 0 and 60, d2) the absolute value of the difference between the value of the colorimetric coordinate b* of the upper portion measured at a point located 10 mm above the median line and the value of the colorimetric coordinate b* of the lower portion measured at a point located 10 mm below the median line is comprised between 0 and 60.

36. The method ac cording to claim 30 or 35, wherein said dyeing step of the optical element is carried out by introducing into the transparent plastics material at least one dyeing substance.

37. The method ac cording to claim 30 or 35, wherein said dyeing step of the optical element is carried cut by dipping the optical element in an aqueous solution comprising at least one disperse dyeing substance.

38. The method according to claim 36, wherein said dyeing step of the optical element is carried out by using at least one Disperse Dye selected among Disperse Blue 7, Disperse Blue 3, Disperse Violet 1, Disperse Yellow 3 and Disperse Red 15.

39. A method for manufacturing a polarized optical element comprising an upper portion and a lower portion defined at opposite parts with respect to a median line passing through the geometric center of the optical element, the method comprising the steps of: providing a polarizing film that is preformed to have a curved surface; placing the polarizing film in a cavity having a concave inner surface and a convex inner surface; providing a mass of transparent plastics material; dyeing the mass of transparent plastics material by means of at least one soluble dyeing substance in such a way that in the lower portion of the optical element and at a distance of at least 10 mm from the median line the factor of luminous transmittance is comprised between 15% and 65%; forming a polarized optical element having a degree of polarization by injecting in said cavity said mass of dyed transparent plastics material; dyeing the upper portion of said optical element in such a way that: a) in the upper portion of the optical element and at a distance of at least 10 mm from the median line the factor of luminous transmittance is comprised between 3% and 20%; b) the colors of the upper and lower portions of the optical element are such that: b1) the absolute value of the difference between the value of the colorimetric coordinate a* of the upper portion measured at a point located 10 mm above the median line and the value of the colorimetric coordinate a* of the lower portion measured at a point located 10 mm below the median line is comprised between 0 and 60, b2) the absolute value of the difference between the value of the calorimetric coordinate b* of the upper portion measured at a point located 10 mm above the median line and the value of the colorimetric coordinate b* of the lower portion measured at a point located 10 mm below the median line is comprised between 0 and 60, wherein the ratio of the luminous transmittance measured in the lower portion at a distance of at least 10 mm below the median line and the luminous transmittance measured in the upper portion at a distance of at least 10 mm above the median line is not lower than 1.5; and wherein the degree of polarization of the optical element is uniform both along a vertical and along a horizontal direction and is equal to at least 45% as measured according to European Standard EN 1836.

40. The method ac cording to claim 34 or 39, wherein said dyeing step of the mass of transparent plastics material is carried out by incorporating in the plastics material at least one soluble dyeing substance.

41. The method ac cording to claim 40, wherein said dyeing step the mass of transparent plastics material is carried out by incorporating into the plastics material at least one Solvent Dye selected among Solvent Green 3, Solvent Yellow 114, Solvent Blue 97, Solvent Violet 36, Solvent Orange 60, Solvent Yellow 93.

42. The method according to claim 37, wherein said dyeing step of the optical element is carried out by using at least one Disperse Dye selected among Disperse Blue 7, Disperse Blue 3, Disperse Violet 1, Disperse Yellow 3 and Disperse Red 15.

* * * * *